United States Patent
Fries et al.

(10) Patent No.: US 12,221,075 B2
(45) Date of Patent: Feb. 11, 2025

(54) SENSOR DEVICE AND DRIVER ASSISTANCE SYSTEM

(71) Applicant: Bayerische Motoren Werke Aktiengesellschaft, Munich (DE)

(72) Inventors: Carsten Fries, Hoehenkirchen-Siegertsbrunn (DE); Sabin Nemes, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 292 days.

(21) Appl. No.: 17/635,408

(22) PCT Filed: Jul. 29, 2020

(86) PCT No.: PCT/EP2020/071367
§ 371 (c)(1),
(2) Date: Feb. 15, 2022

(87) PCT Pub. No.: WO2021/043510
PCT Pub. Date: Mar. 11, 2021

(65) Prior Publication Data
US 2022/0289144 A1    Sep. 15, 2022

(30) Foreign Application Priority Data
Sep. 2, 2019    (DE) ............ 10 2019 123 404.2

(51) Int. Cl.
*B60S 1/02*    (2006.01)
*B60S 1/56*    (2006.01)
(Continued)

(52) U.S. Cl.
CPC .......... *B60S 1/026* (2013.01); *B60S 1/56* (2013.01); *H04N 23/52* (2023.01);
(Continued)

(58) Field of Classification Search
None
See application file for complete search history.

(56) References Cited

U.S. PATENT DOCUMENTS 6,064,430 A * 5/2000 Lefkowitz ............ G08B 15/001
348/E7.086
11,577,695 B2 * 2/2023 Kudo .................. B60H 1/00878
(Continued)

FOREIGN PATENT DOCUMENTS

CN    109641571 A * 4/2019 ................ B60S 1/56
CN    109641571 B * 4/2022 ................ B60S 1/56
(Continued)

OTHER PUBLICATIONS

Korean-language Office Action issued in Korean Application No. 10-2022-7002047 dated Jun. 24, 2023 with English translation (10 pages).
(Continued)

*Primary Examiner* — Ricky Chin
(74) *Attorney, Agent, or Firm* — Crowell & Moring LLP

(57) ABSTRACT

A sensor device includes at least one sensor unit, which is configured to detect a detection area; at least one through element, wherein the at least one sensor unit is configured to detect the detection area through the at least one through element; at least one temperature sensor on or in at least one through element, the at least one temperature sensor being configured to detect a temperature of the at least one through element; at least one heating unit, which is configured to heat the at least one through element; and a controller, which is connected to the at least one temperature sensor and the at least one heating unit and which is configured to control the at least one heating unit based on the temperature detected by the at least one temperature sensor.

10 Claims, 3 Drawing Sheets

(51) Int. Cl.
  *G01S 7/40* (2006.01)
  *G01S 7/497* (2006.01)
  *G01S 7/52* (2006.01)
  *H04N 23/52* (2023.01)
  *H05B 1/02* (2006.01)
  *H05B 3/84* (2006.01)

(52) U.S. Cl.
  CPC .............. *H05B 1/0236* (2013.01); *H05B 3/84* (2013.01); *G01S 7/4047* (2021.05); *G01S 2007/4977* (2013.01); *G01S 2007/52011* (2013.01)

(56) References Cited

U.S. PATENT DOCUMENTS

| | | | |
|---|---|---|---|
| 2009/0040778 A1* | 2/2009 | Takayanagi | B60R 1/30 362/494 |
| 2009/0239083 A1* | 9/2009 | Kojima | G02B 1/111 524/556 |
| 2011/0128362 A1* | 6/2011 | Shi | G06V 10/143 348/E7.085 |
| 2013/0048837 A1* | 2/2013 | Pope | G01J 1/0407 250/214.1 |
| 2013/0094848 A1* | 4/2013 | Wada | H04N 23/698 396/448 |
| 2013/0114949 A1* | 5/2013 | Koh | G02B 7/102 359/825 |
| 2016/0121855 A1 | 5/2016 | Doorley et al. | |
| 2017/0176375 A1* | 6/2017 | Löbbert | G01N 27/40 |
| 2017/0184945 A1 | 6/2017 | Carlson | |
| 2017/0240138 A1* | 8/2017 | Mori | H04N 7/183 |
| 2018/0037268 A1* | 2/2018 | Moore | G01S 7/4813 |
| 2018/0149827 A1* | 5/2018 | Fechner | H04N 23/54 |
| 2019/0088234 A1* | 3/2019 | Xu | G09G 3/20 |
| 2019/0208577 A1 | 7/2019 | Chien | |
| 2019/0299938 A1 | 10/2019 | Deegan | |
| 2020/0047689 A1* | 2/2020 | Kaplan | H04N 23/60 |
| 2020/0252528 A1 | 8/2020 | Wieczorek | |
| 2020/0307525 A1 | 10/2020 | Sparbert | |
| 2020/0346421 A1* | 11/2020 | Amemiya | B29C 37/0053 |
| 2020/0352513 A1* | 11/2020 | Kowarz | A61B 5/0071 |
| 2020/0383224 A1* | 12/2020 | Curran | C25D 11/243 |
| 2021/0258517 A1* | 8/2021 | Reshetouski | G01J 5/0878 |
| 2022/0289144 A1* | 9/2022 | Fries | B60S 1/026 |

FOREIGN PATENT DOCUMENTS

| | | | |
|---|---|---|---|
| DE | 10 2016 123 637 A1 | 6/2018 | |
| DE | 10 2017 206 438 A1 | 10/2018 | |
| DE | 10 2017 117 153 A1 | 1/2019 | |
| DE | 10 2018 204 425 B3 | 5/2019 | |
| DE | 10 2017 221 522 A1 | 6/2019 | |
| FR | 3057500 A1 * | 4/2018 | ....... B32B 17/10036 |
| JP | 2017-144937 A | 8/2017 | |
| KR | 10-2017-0042694 A | 4/2017 | |
| WO | WO-2018007283 A1 * | 1/2018 | ............... B60S 1/56 |

OTHER PUBLICATIONS

International Search Report (PCT/ISA/210) issued in PCT Application No. PCT/EP2020/071367 dated Dec. 14, 2020 with English translation (seven (7) pages).

German-language Written Opinion (PCT/ISA/237) issued in PCT Application No. PCT/EP2020/071367 dated Dec. 14, 2020 (seven (7) pages).

German-language Search Report issued in German Application No. 10 2019 123 404.2 dated Mar. 26, 2020 with partial English translation (12 pages).

Chinese-language Office Action issued in Chinese Application No. 202080060070.X dated Apr. 28, 2023 with English translation (12 pages).

* cited by examiner

SENSOR DEVICE AND DRIVER ASSISTANCE SYSTEM

BACKGROUND AND SUMMARY OF THE INVENTION

The present disclosure relates to a sensor device, to a driver assistance system having a sensor device, and to a vehicle having a sensor device and/or a driver assistance system. In particular, the present disclosure relates to deicing and/or dehumidifying in a detection region of a sensor device, for example in a field of view of a camera that is used, for example, within the scope of automated driving.

Driver assistance systems for automated driving are becoming ever more important. Automated driving can be implemented with different levels of automation. Exemplary levels of automation include driver assistance, partial automation, high automation and full automation. The driver assistance system for automated driving uses sensors which perceive the surround on a visual basis, both in the range visible to humans and in the invisible range. By way of example, the sensors might be a camera, a radar and/or a lidar. In addition to highly accurate maps, these are the principal signal sources for driver assistance systems for automated driving.

Depending on the weather, a detection region or field of view of the sensors may ice over or become fogged. To ensure a reliable surround detection by the sensors it is advantageous to quickly and effectively clear the iced over or fogged surfaces in the detection region or in the field of view of the sensors.

It is an object of the present disclosure to specify a sensor device, a driver assistance system having a sensor device, and a vehicle having a sensor device and/or a driver assistance system, which can improve the surround detection by a sensor device. In particular, it is an object of the present disclosure to improve a driver assistance function for automated driving and/or to design the latter to be safer.

This object is achieved by the claimed invention.

A sensor device is specified according to one independent aspect of the present disclosure. The sensor device comprises at least one sensor unit configured to detect a detection region; at least one passage element, the at least one sensor unit being configured to detect the detection region through the at least one passage element; at least one temperature sensor on or in the at least one passage element, the at least one temperature sensor being configured to measure a temperature of the at least one passage element; at least one heating unit configured to heat the at least one passage element; and a controller connected to the at least one temperature sensor and the at least one heating unit and configured to control the at least one heating unit on the basis of the temperature measured by the at least one temperature sensor.

According to embodiments of the invention, the at least one temperature sensor is arranged on or in the at least one passage element of the sensor device. Expressed differently, the at least one temperature sensor is part of the sensor device and not arranged outside of the sensor device. As a result, it is possible to determine more precisely as to whether the detection region of the at least one sensor unit has iced over or fogged, and so the at least one heating unit can be controlled more precisely and hence it is possible to reduce the time for deicing or dehumidifying. In this way, a driver assistance function for automated driving, for example, can be improved and/or designed to be safer.

The term "detection region", as used within the scope of the present document, relates to a region that is detectable by a sensor unit. In particular, the detection region can be specified or defined by a detection angle of the sensor unit. If the sensor unit is an optical device, for example a camera, the detection region can be a field of view of the optical device. In this case, the field of view describes the region within the viewing angle of the optical device.

Preferably, the at least one passage element is an optical element of a sensor optical unit. The optical element may bring about a change in a beam profile of the optical rays coming from a surround region and striking the at least one passage element. By way of example, the optical element can be a lens, a beam shaping optical unit, etc. In a further example, the optical element may bring about substantially no change in a beam profile of the optical rays coming from a surround region and striking the at least one passage element. By way of example, the optical element can be a cover element, a protective glass, etc.

Preferably, the at least one passage element is a radome. The radome is a closed protective casing which protects the at least one sensor unit (e.g., a radar antenna, a directional antenna, etc.) from external mechanical and chemical influences such as wind or rain. The radome may also be referred to as a "radar dome".

Preferably, the at least one sensor unit is selected from the group comprising, or consisting of, a camera, a radar, a lidar and an ultrasonic sensor. However, the at least one sensor unit is not restricted thereto and may be any other type of sensor unit configured to detect a surround region of a vehicle, for example.

Preferably, a wavelength transparency of the at least one passage element is selected on the basis of the type of the at least one sensor unit utilized. In particular, the at least one passage element is substantially transparent to the wavelengths detectable by the at least one sensor unit. Optionally, the at least one passage element may be opaque to at least some of the wavelengths not detectable by the at least one sensor unit.

Preferably, the at least one passage element is at least partly optically transparent and/or at least partly optically opaque. The terms "optically transparent" and "optically opaque" may relate to the visible wavelength range of light, and in particular to the wavelength range visible to humans. The visible wavelength range may be defined in the range from approximately 750 nm to approximately 400 nm.

In one example, the at least one sensor unit may be a camera, and in particular an imaging camera. In this case, the at least one passage element may be substantially transparent to the visible wavelength range. In a further example, the at least one sensor unit may be a lidar. In this case, the at least one passage element may be transparent to wavelengths detectable by the lidar, and may be substantially opaque to the visible wavelength range.

Preferably, the at least one passage element has a first region which is transparent (e.g., optically transparent) and a second region which is opaque (e.g., optically opaque). The at least one sensor unit can be configured to detect the detection region through the first region of the at least one passage element. The at least one temperature sensor may be arranged in the second region of the at least one passage element. In this way, the at least one temperature sensor can be protected from external influences, for example solar radiation, such that a more precise temperature measurement is facilitated.

Preferably, the controller is configured to set a power of the at least one heating unit in such a way that the temperature of the at least one passage element is less than or equal to a specified threshold. By way of example, the specified threshold may be 70° C. As a result of the direct measurement of the temperature of the at least one passage element, the controller can react more quickly to an actual change in temperature. Hence, the heating unit can be driven with a higher power without the specified threshold being exceeded inadvertently. This facilitates faster deicing and/or dehumidifying of the at least one passage element.

According to a further independent aspect of the present disclosure, a driver assistance system for a vehicle, more particularly a motor vehicle, is specified. The driver assistance system comprises the sensor device as per the embodiments of the present disclosure.

The driver assistance system is preferably configured for automated driving.

In the context of this document, the term "automated driving" can be understood to mean driving with automated longitudinal or lateral control or autonomous driving with automated longitudinal and lateral control. Automated driving can involve for example driving for a relatively long time on the interstate or driving for a limited time in the context of parking or maneuvering. The term "automated driving" encompasses automated driving with any level of automation. Exemplary levels of automation are assisted, partly automated, highly automated or fully automated driving. These levels of automation were defined by the German Federal Highway Research Institute (BASt) (see BASt publication "Research compact", issue November 2012).

In the case of assisted driving, the driver permanently carries out the longitudinal or lateral control, while the system performs the respective other function within certain limits. In the case of partly automated driving, the system performs the longitudinal and lateral control for a certain period of time and/or in specific situations, wherein the driver must permanently monitor the system as in the case of assisted driving. In the case of highly automated driving, the system performs the longitudinal and lateral control for a certain period of time, without the driver having to permanently monitor the system. However, the driver must be able to take over control of the vehicle within a certain time. In the case of fully automated driving, the system can automatically manage driving in all situations for a specific application; a driver is no longer required for this application.

The four degrees of automation mentioned above correspond to SAE levels 1 to 4 of the SAE J3016 standard (SAE—Society of Automotive Engineering). By way of example, highly automated driving corresponds to level 3 of the SAE J3016 standard. Furthermore, SAE J3016 also provides SAE level 5 as the highest level of automation, which is not contained in the definition by the BASt. SAE level 5 corresponds to driverless driving, wherein the system can automatically manage all situations like a human driver during the entire journey; a driver is generally no longer required.

A vehicle, more particularly a motor vehicle, is specified according to a further independent aspect of the present disclosure. The vehicle comprises the sensor device according to, and/or the driver assistance system as per, the embodiments of the present disclosure.

The term vehicle comprises automobiles, trucks, buses, motorhomes, motorcycles, etc., which serve to transport people, goods, etc. In particular, the term comprises motor vehicles for transporting people.

Exemplary embodiments of the disclosure are illustrated in the figures and are described in more detail below.

DETAILED DESCRIPTION OF THE DRAWINGS

Providing nothing else is noted, the same reference signs are used below for the same elements and for elements with same effect.

Figure 1:
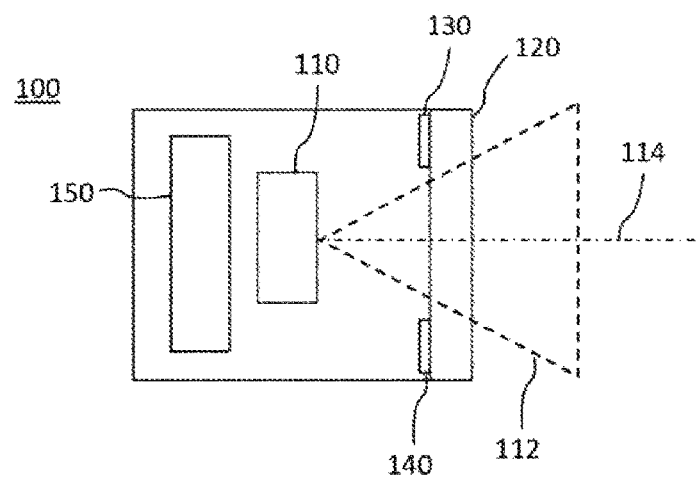
FIG. 1 schematically shows a sensor device according to embodiments of the present disclosure.

FIG. 1 schematically shows a sensor device 100 according to embodiments of the present disclosure.

The sensor device 100 comprises at least one sensor unit 110 configured to detect a detection region 112; at least one passage element 120, the at least one sensor unit 110 being configured to detect the detection region 112 through the at least one passage element 120; at least one temperature sensor 130 on or in the at least one passage element 120, the at least one temperature sensor 130 being configured to measure a temperature of the at least one passage element 120; at least one heating unit 140 configured to heat the at least one passage element 120; and a controller 150 connected to the at least one temperature sensor 130 and the at least one heating unit 140 and configured to control the at least one heating unit 140 of the basis of the temperature measured by the at least one temperature sensor 130.

In the example of FIG. 1, both the at least one temperature sensor 130 and the at least one heating unit 140 are arranged outside of the detection region 114 of the at least one sensor unit 110. The detection by the at least one sensor unit 110 is not impaired by this arrangement.

In some embodiments, the at least one passage element 120 is an optical element of a sensor optical unit. By way of example, the optical element can be a lens, a beam shaping optical unit, a cover element, a protective glass, etc. The at least one passage element 120 may consist of an optically transparent material for example.

In a further example, the at least one passage element 120 may consist of a plastic which is substantially transmissive or transparent to at least a certain wavelength range.

However, the at least one passage element 120 is not restricted to optical elements and could be a radome, for example. The radome is a closed protective casing which protects the at least one sensor unit (e.g., a radar antenna, a directional antenna, etc.) from external mechanical and chemical influences such as wind or rain.

According to some embodiments, the at least one sensor unit 110 is selected from the group comprising, or consisting of, a camera, a radar, lidar and an ultrasonic sensor.

A transmissivity or transparency in relation to certain wavelengths or wavelength ranges of the at least one passage element 120 may be chosen on the basis of the type of the at least one sensor unit 110 utilized. In particular, the at least one passage element 120 can be substantially transmissive or transparent to the wavelengths or wavelength ranges detectable by the at least one sensor unit 110. Optionally, the at least one passage element 120 may be substantially non-transmissive or opaque to at least some of the wavelengths 120 not detectable by the sensor unit 110.

In one example, the at least one sensor unit 110 may be a camera, and in particular an imaging camera. The camera may have an optical axis 114, as shown in the example of FIG. 1. In this case, the at least one passage element 120 may be substantially transparent to the visible wavelength range. In a further example, the at least one sensor unit 110 may be a radar, lidar or ultrasonic sensor. In this case, the at least one passage element 120 may be transmissive or transparent to the wavelengths detectable by the radar, the lidar or the ultrasonic sensor, and may be substantially non-transmissive or opaque to the visible wavelength range.

In some embodiments, the controller 150 is configured to set a power of the at least one heating unit 140 in such a way that the temperature of the at least one passage element 120 is less than or equal to a specified threshold. By way of example, the specified threshold may be 70° C. As a result of the direct measurement of the temperature of the at least one passage element 120, the controller 150 can react more quickly to an actual change in temperature. Hence, the heating unit 140 can be driven with a higher power without the specified threshold being exceeded inadvertently. This facilitates faster deicing and/or dehumidifying of the at least one passage element 120.

The at least one heating unit 140 can be a resistance heater. In some embodiments, the at least one heating unit 140 can be attached directly to an outer surface of the at least one passage element 120. In further embodiments, the at least one heating unit 140 can be embedded in the at least one passage element 120.

Figure 2:
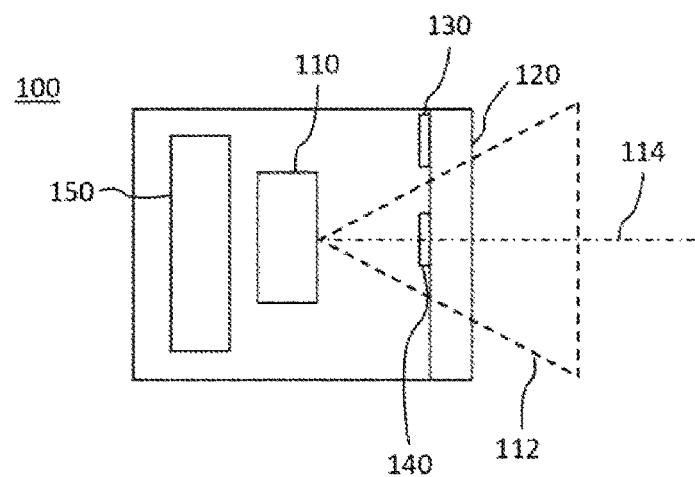
FIG. 2 schematically shows a sensor device according to further embodiments of the present disclosure.

FIG. 2 schematically shows a sensor device 100 according to further embodiments of the present disclosure.

In the example of FIG. 1, both the at least one temperature sensor 130 and the at least one heating unit 140 are arranged outside of the detection region 114 of the at least one sensor unit 110. Alternatively, the at least one temperature sensor 130 and/or the at least one heating unit 114 may be arranged within the detection region 114 of the at least one sensor unit 110.

FIG. 2 shows an exemplary arrangement of the at least one heating unit 140 within the detection region 114 of the at least one sensor unit 110. The at least one temperature sensor 130 may be arranged outside of the detection region 114 of the at least one sensor unit 110. Such an arrangement is advantageous for ensuring fast deicing or dehumidifying of the at least one passage element 120 in the detection region 114 of the at least one sensor unit 110.

In some embodiments, the at least one heating unit 140 can be configured such that it substantially does not influence a detection by the at least one sensor unit 110. By way of example, the at least one heating unit 140 may consist of a transparent material. Additionally or as an alternative, the at least one heating unit 140 may comprise a plurality of elongate heating elements (not shown) which have a thickness small enough to substantially not influence the detection by the at least one sensor unit 110.

Figure 3:
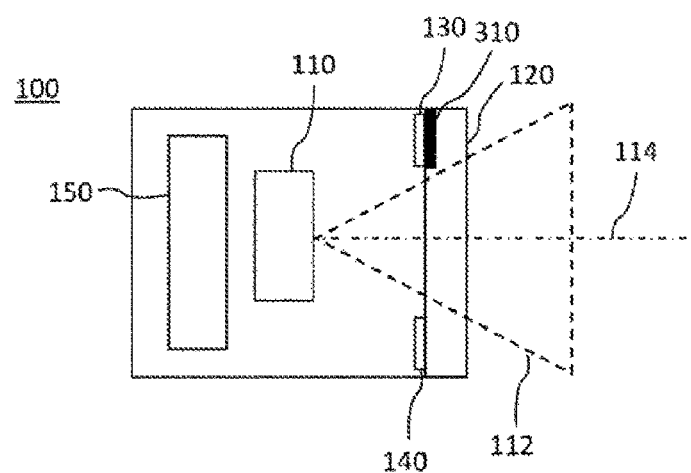
FIG. 3 schematically shows a sensor device according to further embodiments of the present disclosure.

FIG. 3 schematically shows a sensor device 100 according to further embodiments of the present disclosure.

In some embodiments, the at least one passage element 120 has a first region which is transparent (e.g., optically transparent) and a second region which is opaque (e.g., optically opaque). The at least one sensor unit 110 can be configured to detect the detection region through the first region of the at least one passage element 120. The at least one temperature sensor 130 may be arranged in the second region of the at least one passage element 120. In this way, the at least one temperature sensor 130 can be protected from external influences, for example solar radiation, such that a more precise temperature measurement by the at least one temperature sensor 130 is facilitated.

In an exemplary embodiment, the second region can be defined by a black mask 310. The black mask 310 may be applied to a surface of the at least one passage element 120 in order to define the first region and the second region.

However, the present disclosure is not restricted thereto, and the first region and the second region may be provided by material properties of the at least one passage element 120, for example.

Figure 4:
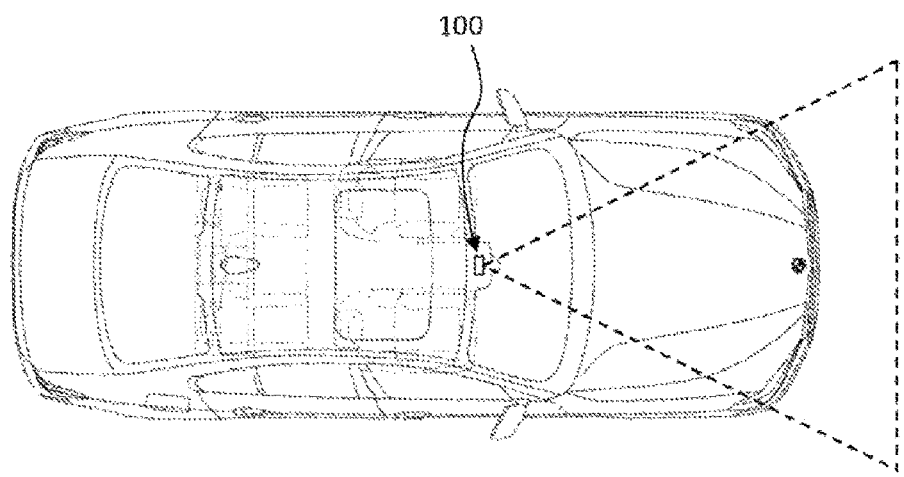
FIG. 4 schematically shows a vehicle having a sensor device according to embodiments of the present disclosure.

FIG. 4 schematically shows a vehicle 400 having a sensor device 100 according to embodiments of the present disclosure. In particular, the vehicle 400 may be a motor vehicle.

The vehicle 400 may comprise a driver assistance system and the sensor device 100 according to the embodiments of the present disclosure. In particular, the sensor device 100 may be provided as a component of the driver assistance system. The driver assistance system may be configured for automated driving.

Within the scope of automated driving, the longitudinal and lateral control of the vehicle 400 are implemented automatically. Thus, the driver assistance system takes over the vehicle control. To this end, the driver assistance system controls the drive, the transmission, the hydraulic service brakes and the steering.

To plan and carry out automated driving, surround information from a surround sensor system observing the vehicle surround is received by the driver assistance system. In particular, the vehicle 400 may comprise at least one sensor device 100 according to the embodiments of the present disclosure, which are configured to record surround data specifying the vehicle surround. By way of example, the at least one sensor device 100 may comprise a lidar system, a radar system and/or a camera.

Figure 5:
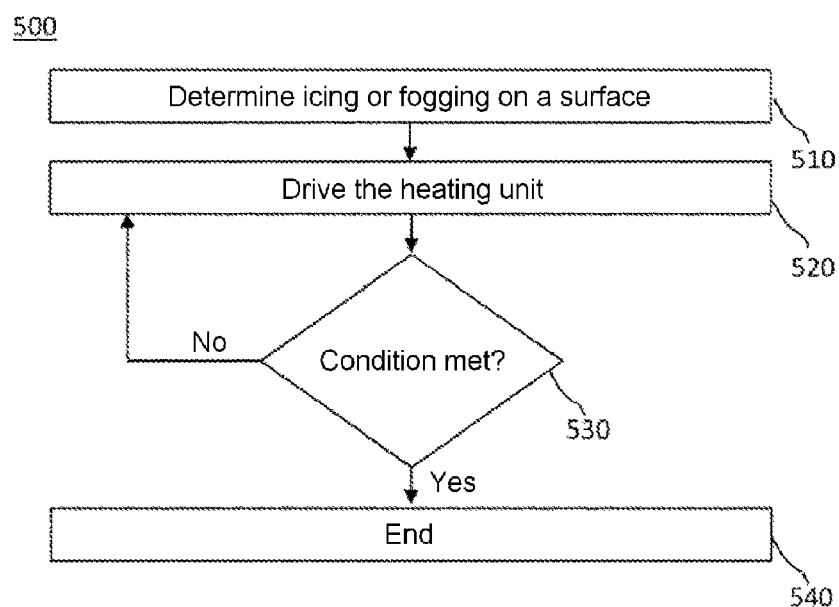
FIG. 5 schematically shows a flowchart of a method for operating a sensor device according to embodiments of the present disclosure.

FIG. 5 schematically shows a flowchart of a method 500 for operating a sensor device according to embodiments of the present disclosure. The method 500 may be implemented by an appropriate algorithm that is executable by a processor (e.g., CPU).

In block 510 of the method 500, icing or fogging is detected in the detection region of the sensor device. This detection may be used as a trigger to drive the heating unit in block 520 in order to deice or dehumidify the detection region of the sensor device. The heating unit may be driven on the basis of the measured temperature in or on the detection region, at least one heating restriction (e.g., a maximum heating temperature), a heating strategy, etc.

The heating unit can be operated until at least one termination condition is satisfied in block 530. By way of example, the at least one termination condition may be the at least one heating restriction, the complete clearing of deiced or fogged surfaces, etc. If the at least one termination condition is satisfied, the heating process is terminated in block 540.

According to embodiments of the invention, the at least one temperature sensors is arranged on or in the at least one passage element of the sensor device. Expressed differently, the at least one temperature sensor is part of the sensor device and is not arranged outside of the sensor device. As a result, it is possible to determine more precisely whether the detection region of the at least one sensor unit is iced or fogged, and so the at least one heating unit can be controlled more precisely and hence a time for deicing or dehumidifying can be reduced. In this way, it is possible to improve, e.g., a driver assistance function for automated driving and/or design the latter to be safer.

What is claimed is:

1. A sensor device comprising:
   at least one sensor unit configured to detect a detection region;
   at least one passage element, the at least one sensor unit being configured to detect the detection region through the at least one passage element;
   at least one temperature sensor on or in the at least one passage element, the at least one temperature sensor being configured to measure a temperature of the at least one passage element;
   at least one heating unit configured to heat the at least one passage element; and
   a controller connected to the at least one temperature sensor and the at least one heating unit and configured to control the at least one heating unit based on the temperature measured by the at least one temperature sensor,
   wherein the at least one passage element is a unitary structure consisting of an optical element or a radome, and an entirety of the unitary structure is transparent to wavelengths that are detectable by the at least one sensor unit,
   wherein a black mask that is applied to a surface of the at least one passage element defines a first region which is transparent to the wavelengths that are detectable by the at least one sensor unit and a second region which is opaque to the wavelengths that are detectable by the at least one sensor unit,
   wherein the at least one sensor unit is configured to detect the detection region through the first region, and
   wherein the at least one temperature sensor is arranged in the second region.

2. The sensor device according to claim 1, wherein the at least one sensor unit is a camera.

3. The sensor device according to claim 1, wherein the at least one sensor unit is a radar, a lidar or an ultrasonic sensor.

4. The sensor device according to claim 1, wherein the controller is configured to set a power of the at least one heating unit such that the temperature of the at least one passage element is less than or equal to a specified threshold.

5. A driver assistance system comprising the sensor device according to claim 1.

6. The driver assistance system according to claim 5, wherein the driver assistance system is configured for automated driving.

7. A vehicle comprising the sensor device according to claim 1.

8. The vehicle of claim 7, wherein the vehicle is a motor vehicle.

9. A vehicle comprising the driver assistance system of claim 5.

10. The vehicle of claim 9, wherein the vehicle is a motor vehicle.

* * * * *